United States Patent [19]

Bernstein et al.

[11] 4,131,637

[45] Dec. 26, 1978

[54] GRAFTED POLYMERIC MATERIAL AND PROCESS FOR PREPARING

[75] Inventors: Philip Bernstein, Yardley; James P. Coffey, Hatboro; Alan E. Varker, Philadelphia, all of Pa.

[73] Assignee: ESB Incorporated, Philadelphia, Pa.

[21] Appl. No.: 780,578

[22] Filed: Mar. 23, 1977

[51] Int. Cl.² ............................................. C08F 255/00
[52] U.S. Cl. ................................. 260/877; 260/878 R; 429/206; 526/58
[58] Field of Search ............................. 260/877, 878 R

[56] References Cited

U.S. PATENT DOCUMENTS

| | | | |
|---|---|---|---|
| 3,271,477 | 9/1966 | Kresge | 260/877 |
| 3,716,391 | 2/1973 | Hosoda et al. | 260/877 X |
| 3,870,692 | 3/1975 | Patton | 260/93.7 |
| 3,890,293 | 6/1975 | Yukuta et al. | 260/80.78 |

*Primary Examiner*—Thomas De Benedictis, Sr.
*Attorney, Agent, or Firm*—Gilbert W. Rudman; Anthony J. Rossi; Gary V. Pack

[57] ABSTRACT

A process for preparing a polymeric material grafted throughout its bulk is provided. A polymer having finely divided particles is blended with silica and maintained in a fluidized bed. The polymer is activated by passing ozone uniformly through the blend to initiate incipient labile sites in the molecular structure of the polymer. The polymer is then reacted with an ethylenically unsaturated ionogenic monomer to graft polymerize the monomer onto the polymer. The grafted polymer may then be converted to a salt form by reacting with alkaline compounds. The resultant powders can be fused into any desired shape by conventional polymer plastic processes.

9 Claims, No Drawings

GRAFTED POLYMERIC MATERIAL AND PROCESS FOR PREPARING

BACKGROUND OF THE INVENTION

Field of the Invention

The present invention relates to a process for forming a grafted polymeric material wherein the grafting extends throughout the bulk of the material and to the grafted polymer so formed.

Prior Art

The cross-linking and grafting of polymers has been known for many years. For instance, the cross-linking of polyethylene by irradiation has been known whereby the polyethylene base is provided with superior chemical and physical properties. The grafting of polymers and particularly polyethylene film has been used to prepare separators for alkaline cells and more particularly silver zinc cells.

Typically, polyethylene in film form is activated by exposing it to gamma ray irradiation (Fydelor et al, Power Sources Symposium, Brighton, England, 1970 at page 327). Another approach is to use Van de Graaf accelerator radiation to graft in the absence of air, (U.S. Atomic Energy Commissioner TIO 7643398 (1962) Chemical Abstracts 58, 5835E (1963). Typically, the grafting proceeds in the presence of radiation while the polymer is in intimate contact with an appropriate monomer, such as methacrylic acid. In U.S. Patent 3,955,014 it is suggested that a polyethylene film wetted by a solution of benzophenone in tuluene can be activated by ultraviolet radiation, then immersed in methacrylic acid. The grafting process then proceeds, the carboxyl groups of the monomer combining at the activated, or labile, sites on the surface of the polyethylene. Using the latter method, graft levels of up to 50% by weight have been achieved.

Despite their wide acceptance, the foregoing approaches all exhibit severe disadvantages. With the Van de Graaf accelerator radiation mentioned above, high energy irradiation is required, and the process must proceed in an evacuated environment. The use of gamma radiation involves a degree of risk inherent with such radiation. Also, there may be substantial loss of the monomer due to homopolymerization.

A deficiency of the prior art methods of activating and polymerizing polymers in sheet form is the limited depth to which such polymerization has been achieved. This is a particular disadvantage in the manufacture of separators for silver zinc cells since the extremely thin layer of grafts upon the polymer film is rapidly oxidized and degraded by the silver ions. Once this occurs, the grafted balance of the separator rapidly degrades and the cell fails. Another deficiency of the prior art methods is the degree of grafting which has been achieved. It has been shown that the degree of grafting in a film determines the film resistance, and ultimately the alkaline cell impedence, therefore, a degree of grafting limited to about 50 to about 100% by weight is a severe limitation to usefulness in alkaline cells.

Accordingly, it would be highly desirable to provide a process for obtaining a grafted polymer which has an increased degree of grafting and which results in vastly improved ion transfer and wetting characteristics.

It is, therefore, an object of this invention to provide an improved polymeric material which has grafting sites throughout its bulk. Another object of the invention is to provide a process wherein the degree of graft polymerization is increased substantially, as much as 4 fold, beyond the existing art.

SUMMARY OF THE INVENTION

A grafted polymeric material is formed by a process of suspending and agitating a quantity of finely divided polymers blended with silica in a fluidized bed and then introducing ozone into the fluidized bed. The ozone activates the polymer by initiating incipient labile cites in the molecular structure of the polymer. The activated polymer is then reacted with an ethylenically unsaturated ionogenic monomer to graft polymerize that monomer onto the polymer.

DESCRIPTION OF THE INVENTION

The polymers which are utilizable in this invention are polyolefins, polyesters, polyamides, polyhalocarbons, aliphatic and aromatic substituted polyhydrocarbons, hydrogenated polyhydrocarbons and the like. Preferred polymers are polyethylene, polypropylene, polyvinylchloride, polystyrene and their co-polymers. The most preferred polymer is polyethylene. Although both high density and low density polyethylene can be used in this invention, it has been found that low density polyethylene reacts more completely and hence, is more preferred. By "low density" is meant, polyethylene exhibiting a density of less than 0.92 grams per cubic centimeter. By "finely divided" is meant a polymer having particles which have an average diameter of about 5 to 50 microns. Preferably, the diameter of these particles will range from 15 to 25 microns.

A small amount (at least 0.1% by weight based on the weight of the polymer) of powdered silica is necessary to achieve fluidity and to prevent agglomeration of the polymer particles. Preferred is the use of 0.5 to 5% of silica, especially fumed silica. The most preferred amount is about 0.5%. At this level the silica provides the necessary fluidity without substantially entering into the reactions during ozonization or in subsequent processing.

The fluidizing bed is maintained in a state of constant agitation to assist in the process. Ozone is introduced into the inflowing gas so as to pass through the fluidized material and come into intimate contact with the finely divided polymer. The polymer is activated by the ozone. By "activated" is meant, the preparation of the polymer for subsequent grafting wherein incipient labile sites are produced at various points along the chain like molecules of the polymer.

When low density polyethylene is utilized, the ozonization is continued until the amount of ozone absorbed is 500–600 milligrams, preferably about 540 milligrams, of ozone per 100 grams of polyethylene. The degree of ozonization is commonly measured by the Iodometric determination of the peroxide value of the polyethylene, as is known by those skilled in the art.

With the process of this invention, peroxide values may range from 20 to 60 mole peroxide per kilogram of polyethylene. The preferred values for use in this invention are from 30 to 40 mole per kilogram. Even more preferred is a peroxide value of about 38 mole per kilogram.

One process to achieve ozonization while maintaining the polymer in a fluidized bed is placing the finely divided polymer in a vessel having a diffuser at its bottom and forcing air or similar carrier gas upwardly through the diffuser and through the body of the finely divided polymer so as to maintain the polymer in a fluidized state and to insure the even distribution of activated sites throughout the polymer.

The activated polymer is then reacted with an ethylenically unsaturated ionogenic monomer. Suitable monomers are sodium styrene sulfonate, sodium vinyl sulfonate, crotonic acid, methacrylic acid, acrylic acid, vinyl pyridine, vinyl benzylchloride, vinyl pyrolidone, and the like. The preferred monomers are acrylic acid and methacrylic acid. The most preferred monomer is methacrylic acid which produces a graft polymer containing carboxyl groups.

One process to achieve polymerization of the activated polymer with ethylenically unsaturated ionogenic monomer is loading the activated polymer into an appropriate container with an aqueous solution of the monomer and then refluxing. In this manner, the activated polymer is reacted with the ethylenically unsaturated ionogenic monomer to produce a graft polymer in which groups from the monomer are attached to the previously prepared labile sites.

By using activated low density polyethylene having a peroxide value from 20 to 60 and by varying the ratio of methacrylic acid to activated polymer, the resulting level of graft polymerization is from 30 to 440% by weight.

The grafted polymer may be converted into its salt form by reacting it with alkaline compounds. Suitable alkaline compounds are alkaline metal oxides and hydroxides, alkaline earth oxides and hydroxides, amines and amine hydroxides and the like. The preferred are alkali metal and ammonium hydroxide. The most preferred is potassium hydroxide. After conversion to the salt form, the polymer material may be washed and dried to form a finely divided grafted polymer powder which can be subsequently prepared as appropriate for a desired use.

The grafted polymeric material of this invention has usefulness in many areas known in the art, such as, resisting acceptance of static charges, preparing surfaces for dyes and adhesives, causing display of hydroscopic reaction from previously unwettable polymers. It also is contemplated that other modifications or applications will occur to those skilled in the art.

Another important use of the grafted polymer material of this invention, because to the ion transfer and wetting characteristics of its films and the oxidation resistance throughout its bulk, is as a separator for alkaline cells, more particularly, for silver zinc cells an alkaline cell is comprised of an anode, cathode, alkaline electrolyte, preferably KOH or NaOH, and a separator between the electrodes. The powdered grafted polymeric material can be fused in any conventional manner. It is moldable into any desired shape. It can be calendared or extruded into sheet form for the many varied uses.

EXAMPLE 1

A finely divided low density polyethylene having particles exhibiting diameters on the order of 20 microns and having a density of approximately 0.915 grams per cc (Microtheme FN-500 sold by USI Corporation) was blended with a fumed silica powder (Cab-O-Sil sold by the Cabot Corporation) in a ratio of 6 oz. of silica to 75 pounds of polyethylene. The finely divided polymer was mixed and loaded into a cylindrical container having a porous ceramic member at the bottom and air passed upwardly through the enclosure to fluidize the silica-polyethylene blend and to insure the even distribution of activated sites throughout the polyethylene. The fluidized bed was maintained in a state of constant agitation to assist in the process, and ozone was introduced into the inflowing air at a concentration of 1% by volume in air and at a rate of 1.5 cubic standard feet per minute so as to pass upwardly through the fluidized material. Ozonization was continued until approximately 540 milligrams of ozone was absorbed per 100 grams of polyethylene. The resultant activated polyethylene was then loaded into a round bottom reaction flask containing an aqueous methacrylic acid solution. 280 grams of ozonized polyethylene were added to 480 grams of methacrylic acid and 4.3 liters of deionized water. The reactor was heated and the contents stirred constantly. Stirring and reflux were maintained for four hours at approximately 100° C. After refluxing, the reactant mixture was allowed to cool to approximately 95° C. and seven liters of deionized water were added, stirring continuing for one half hour. Stirring was then discontinued and the product allowed to settle. The supernatant liquid was drawn off and discarded. 3200 millileters of deionized water and 4800 liters of methanol were added. This mixture was stirred one half hour and allowed to settle. This step was repeated and the supernatant liquid drawn off. Finally, the residue was neutralized by combining it with a mixture of 720 grams of 45% potassium hydroxide with 4 liters of methanol. The residue was stirred for one hour to maintain it in small granules. Stirring was stopped and the product was allowed to settle. The supernatant liquid was drawn off and the resulting product was washed twice with aqueous methanol as before. The precipitate was then discharged into a vacuum filter where it was suctioned filtered and washed with a solution of methanol and water prepared in the ratio of 3 to 2 by volume. The filtered, washed product was then dried.

The dry grafted polymer can be stored or used immediately. It may easily be processed in the ways commercially available finely divided polyethylene is processed. That is, it may be fused and molded, extruded, pressed or calendared into any desired form. By placing the dried powdered product on a rubber mill having rolls heated to approximately 130° C., the material may be fused and sheeted to a thickness of approximately 2 mils to 15 mils. In this form, the product may be used as a separator for alkaline battery cells. This film will have grafted sites throughout its depth.

EXAMPLE 2

Finely divided polyvinylchloride, (Geon 121, sold by Goodrich Corp.), was blended with fumed silica powder (Cab-O-Sil sold by Cabot Corp.) in the same ratio as in example 1. The finely divided material was mixed and loaded into a cylindrical container having a porous ceramic member at the bottom. Air was passed upwardly through the enclosure to fluidize the blended material and to insure the even distribution of activating sites throughout the polymer. The fluidized bed was maintained in a state of constant agitation. Ozone was introduced into the inflowing air, the ozone comprising 1% by volume in air (1.5 CFM), to pass upwardly through the fluidized material. Ozonization was continued until approximately 540 mg of ozone was absorbed per 100 g of polyvinyl chloride. The resultant activated material was then loaded into a round-bottom reaction flask containing an aqueous methacrylic acid solution. 10 gms of the activated polyvinyl chloride produced above was added to 20 grams of methacrylic acid, and 180 ml of water. The reactor was heated, and the contents stirred constantly. Stirring and reflux were maintained for four hours at approximately 100° C. After refluxing, the reacted mixture was allowed to cool to approximately 95° C. 250 mil of deionized water was added and stirring continued for one-half hour. Stirring was then discontinued and the product was allowed to settle. The supernatant liquid was drawn off and discarded. A wash of 286 mil of deionized water was added. The mixture was stirred one-half hour and allowed to settle. The supernatant was drawn off. The product was washed a second time as above. Finally, the residue was neutralized by mixing it with a mixture of 51 g of 45% potassium hydroxide with 188 mil of methanol. The residue was stirred for one hour to maintain it as small granules, stirring was stopped and the product was allowed to settle. The supernatant liquid was drawn off and the resulting product washed with methanol. The precipitate was then discharged into a vacuum filter, where it was suction filtered and washed with 400 mil of methanol. The filtered, washed product was then dried. Approximately 38.84 grams of grafted polyvinyl chloride was obtained, indicating 288% extent of grafting.

CLAIMS

We claim:

1. A grafted polymeric composition formed by the process of:
   (a) suspending and agitating a quantity of finely divided polymeric material selected from the group consisting of polyethylene, polypropylene, and polyvinylchloride, wherein the polymeric material is comprised of particles having a particle size of about 15 to 25 microns; and wherein the polymeric material is blended with 0.5-5%, by weight of the polymeric material, silica, and wherein the suspending and agitating is in a fluidized bed at ambient temperature;
   (b) introducing ozone into said fluidized bed, at ambient temperature, for activating said material by initiating incipient labile sites in the molecular structure of said material; and
   (c) reacting the activating material with an ethylenically unsaturated ionogenic monomer, at an elevated temperature, to graft polymerize the monomer onto said material.

2. The grafted polymeric composition according to claim 1, wherein the process of forming said composition further comprises the step of converting the grafted material into salt form by reacting the grafted material with alkalie compound.

3. The composition of claim 1, wherein the finely divided polymer material is polyethylene, polypropylene, or polyvinylchloride.

4. The composition of claim 3, wherein the polymer has particles of an average diameter of about 5 to 50 microns.

5. The composition of claim 1, wherein the ethylenically unsaturated ionogenic monomer is methacrylic acid or acrylic acid.

6. A grafted polymeric composition formed by the process of:
   (a) suspending and agitating a quantity of polyethylene having a particle size of about 15 to 25 microns blended with 0.5-5% by weight based on the weight of the polyethylene fumed silica in a fluidized bed;
   (b) introducing ozone into the fluidized bed maintain at ambient temperature until the amount of ozone absorbed is approximately 500-600 milligrams per 100 grams of polyethylene;
   (c) reacting the ozonated material with methacrylic acid until the graft polymerization is from 30 to 440° by weight of the polyethylene.

7. A process for obtaining a grafted polymeric composition comprising the steps of:
   (a) suspending and agitating a quantity of finely divided polymeric material selected from the group consisting of polyethylene, polypropylene, and polyvinylchloride, wherein the polymeric material is comprised of particles having a particle size of about 15 to 25 microns; and wherein the polymeric material is blended with 0.5-5%, by weight of the polymeric material, silica, and wherein the suspending and agitating is in a fluidized bed at ambient temperature;
   (b) introducing ozone into said fluidized bed at ambient temperature for activitating the material of step A by initiating incipient labile sites in the molecular structure of the material; and
   (c) reacting the activated material of step B with an ethylenically unsaturated ionogenic monomer, at an elevated temperature, to graft polymerize the monomer onto the material.

8. The process of claim 7 wherein the finely divided polymer material is polyethylene, polypropylene or polyvinylchloride.

9. The process of claim 7 wherein the finely divided polymer material is polyethylene having particles of an average diameter of about 5 to 50 microns, and the ethylenically unsaturated monomer is methacrylic acid.

* * * * *